US009787814B2

(12) United States Patent
Ding

(10) Patent No.: US 9,787,814 B2
(45) Date of Patent: Oct. 10, 2017

(54) MOBILE TERMINAL AND METHOD FOR STARTING SHOOTING ON MOBILE TERMINAL

(71) Applicant: Huawei Device Co., Ltd., Shenzhen (CN)

(72) Inventor: Ji Ding, Shanghai (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 0 days.

(21) Appl. No.: 15/034,011

(22) PCT Filed: Dec. 25, 2013

(86) PCT No.: PCT/CN2013/090445
§ 371 (c)(1),
(2) Date: May 3, 2016

(87) PCT Pub. No.: WO2015/096067
PCT Pub. Date: Jul. 2, 2015

(65) Prior Publication Data
US 2016/0269529 A1 Sep. 15, 2016

(51) Int. Cl.
*H04M 1/725* (2006.01)
*H04M 1/02* (2006.01)
(Continued)

(52) U.S. Cl.
CPC ..... *H04M 1/72522* (2013.01); *H04M 1/0264* (2013.01); *H04M 1/236* (2013.01); *H04M 1/67* (2013.01); *H04M 2250/52* (2013.01)

(58) Field of Classification Search
CPC . H04M 1/0264; H04M 1/236; H04M 1/72522
See application file for complete search history.

(56) References Cited

U.S. PATENT DOCUMENTS 5,412,425 A * 5/1995 Nagano ............... G02B 7/102
348/333.13
2009/0124239 A1* 5/2009 Tsuei ................. H04M 1/2745
455/414.1
(Continued)

FOREIGN PATENT DOCUMENTS

CN 103002152 A 3/2013
CN 103019542 A 4/2013
(Continued)

OTHER PUBLICATIONS

Partial English Translation and Abstract of Chinese Patent Application No. CN103019542, May 12, 2016, 3 pages.
(Continued)

*Primary Examiner* — Tuan Pham
(74) *Attorney, Agent, or Firm* — Conley Rose, P.C.

(57) ABSTRACT

Embodiments of the present disclosure disclose a mobile terminal and a method for starting shooting on a mobile terminal, which are used to enable a user of a mobile terminal to capture a view quickly. The mobile terminal includes a camera, a control module, and a button disposed on a housing of a mobile terminal, where the control module is configured to perform detection with respect to the button when the mobile terminal is in standby mode with a lock screen activated, and turn on the camera for shooting when detecting that a pressing operation of a user on the button meets a first preset condition. According to the embodiments of the present disclosure, a user of a mobile terminal can capture a view quickly; therefore, photo shooting experience of the user is improved.

18 Claims, 4 Drawing Sheets

(51) Int. Cl.
*H04M 1/23* (2006.01)
*H04M 1/67* (2006.01)

(56) References Cited

U.S. PATENT DOCUMENTS

| | | | |
|---|---|---|---|
| 2009/0224955 A1* | 9/2009 | Bates | G08C 17/02 341/175 |
| 2010/0269040 A1 | 10/2010 | Lee | |
| 2012/0009896 A1* | 1/2012 | Bandyopadhyay | G06F 1/1643 455/411 |
| 2012/0233571 A1* | 9/2012 | Wever | G06F 3/048 715/835 |
| 2013/0102273 A1 | 4/2013 | Jung et al. | |
| 2013/0318476 A1 | 11/2013 | Sauve et al. | |
| 2014/0333591 A1* | 11/2014 | Bell | G06F 1/1626 345/184 |

FOREIGN PATENT DOCUMENTS

| | | |
|---|---|---|
| CN | 103024258 A | 4/2013 |
| CN | 203070267 A | 7/2013 |
| CN | 203151568 U | 8/2013 |
| CN | 103312876 A | 9/2013 |
| CN | 103402004 A | 11/2013 |
| JP | 2000222185 A | 8/2000 |
| JP | 2000307920 A | 11/2000 |
| JP | 2005121842 A | 5/2005 |
| JP | 2012257324 A | 12/2012 |
| JP | 2013534121 A | 8/2013 |
| JP | 2013539621 A | 10/2013 |
| KR | 20130079021 A | 7/2013 |

OTHER PUBLICATIONS

Partial English Translation and Abstract of Chinese Patent Application No. CN103312876, May 12, 2016, 4 pages.
Partial English Translation and Abstract of Chinese Patent Application No. CN203070267, May 12, 2016, 3 pages.
Partial English Translation and Abstract of Chinese Patent Application No. CN203151568, Nov. 7, 2016, 5 pages.
Partial English Translation and Abstract of Chinese Patent Application No. CN103402004, Sep. 18, 2016, 4 pages.
Foreign Communication From a Counterpart Application, European Application No. 13900482.4, Extended European Search Report dated Oct. 12, 2016, 7 pages.
Foreign Communication From a Counterpart Application, Chinese Application No. 201380072562.0, Chinese Office Action dated Aug. 2, 2016, 7 pages.
Foreign Communication From a Counterpart Application, PCT Application No. PCT/CN2013/090445, English Translation of International Search Report dated Sep. 30, 2014, 2 pages.
Foreign Communication From a Counterpart Application, PCT Application No. PCT/CN2013/090445, English Translation of Written Opinion dated Sep. 30, 2014, 13 pages.
Machine Translation and Abstract of Korean Publication No. KR20130079021, Jul. 10, 2013, 21 pages.
Foreign Communication From a Counterpart Application, Korean Application No. 10-2016-7013676, Korean Office Action dated Feb. 7, 2017, 5 pages.
Foreign Communication From A Counterpart Application, Korean Application No. 10-2016-7013676, English Translation of Korean Office Action dated Feb. 7, 2017, 3 pages.
Machine Translation and Abstract of Chinese Publication No. CN103002152, Mar. 27, 2013, 6 pages.
Machine Translation and Abstract of Chinese Publication No. CN103024258, Apr. 3, 2013, 7 pages.
Machine Translation and Abstract of Japanese Publication No. JP2000222185, Aug. 11, 2000, 11 pages.
Machine Translation and Abstract of Japanese Publication No. JP2000307920, Nov. 2, 2000, 21 pages.
Machine Translation and Abstract of Japanese Publication No. JP2005121842, May 12, 2005, 14 pages.
Machine Translation and Abstract of Japanese Publication No. JP2012257324, Dec. 27, 2012, 18 pages.
Foreign Communication From A Counterpart Application, Japanese Application No. 2016-526921, Japanese Office Action dated Jun. 13, 2017, 3 pages.
Foreign Communication From A Counterpart Application, Japanese Application No. 2016-526921, English Translation of Japanese Office Action dated Jun. 13, 2017, 4 pages.

* cited by examiner

MOBILE TERMINAL AND METHOD FOR STARTING SHOOTING ON MOBILE TERMINAL

CROSS-REFERENCE TO RELATED APPLICATIONS

This application is a U.S. National Stage of International Application No. PCT/CN2013/090445, filed on Dec. 25, 2013, which is hereby incorporated by reference in its entirety.

TECHNICAL FIELD

The present disclosure relates to the field of mobile communications, and in particular, to a mobile terminal and a method for starting shooting on a mobile terminal.

BACKGROUND

Cameras with increasingly more pixels are integrated into mobile phones, and in daily life, people increasingly use mobile phones instead of dedicated cameras to shoot photos. However, a mobile phone stays at a lock screen in most cases. To shoot a photo or video when seeing a novel or special scene or a wonderful moment, a mobile phone user needs to complete the following steps: 1) press a power button to lighten the screen, 2) unlock the screen, 3) start a camera application, 4) switch to a photo or video shooting program, 5) find a shooting range, and 6) press a shooting button. However, a wonderful view is instantaneous and usually has gone by the time the mobile phone user accesses the photo or video shooting program.

SUMMARY

Embodiments of the present disclosure provide a mobile terminal and a method for starting shooting on a mobile terminal, which can improve photo shooting experience of a user.

A first aspect of the embodiments of the present disclosure provides a mobile terminal, including a camera, a control module, and a button disposed on a housing of the mobile terminal, wherein the control module is configured to perform detection with respect to the button when the mobile terminal is in a standby mode with a lock screen activated, and turn on the camera for shooting when detecting that a pressing operation of a user on the button meets a first preset condition.

With reference to the first aspect of the embodiments of the present disclosure, in a first implementation manner of the first aspect of the embodiments of the present disclosure, the control module is specifically configured to when detecting that a duration that the user continuously presses the button reaches a preset duration or when detecting that the preset duration that the user continuously presses the button reaches a preset quantity of times, determine that the pressing operation of the user on the button meets the first preset condition.

With reference to the first aspect of the embodiments of the present disclosure, in a second implementation manner of the first aspect of the embodiments of the present disclosure, when detecting that the pressing operation of the user on the button meets the first preset condition, the control module is specifically configured to turn on the camera to get ready for shooting, and the control module is further configured to after the camera is turned on to get ready, when detecting that the pressing operation of the user on the button meets a second preset condition, control the camera to perform shooting, or when detecting that the pressing operation of the user on the button does not meet the second preset condition the button meets a second preset condition, turn off the camera.

With reference to the first aspect of the embodiments of the present disclosure, in a third implementation manner of the first aspect of the embodiments of the present disclosure, when detecting that the pressing operation of the user on the button meets the first preset condition, the control module is specifically configured to control the camera to turn on and perform shooting.

With reference to the first aspect of the embodiments of the present disclosure, in a fourth implementation manner of the first aspect of the embodiments of the present disclosure, after the mobile terminal is unlocked, when the pressing operation of the user on the button meets a third preset condition, the control module controls the mobile terminal to implement a default function corresponding to the button.

With reference to the first aspect of the embodiments of the present disclosure, or the first implementation manner of the first aspect, or the second implementation manner of the first aspect, or the third implementation manner of the first aspect, or the fourth implementation manner of the first aspect, in a fifth implementation manner of the first aspect of the embodiments of the present disclosure, the button includes a first button and a second button, when detecting that a pressing operation of the user on the first button meets the first preset condition, the control module turns on the camera for video shooting, and when detecting that a pressing operation of the user on the second button meets the first preset condition, the control module turns on the camera for photo shooting.

With reference to the first aspect of the embodiments of the present disclosure, or the first implementation manner of the first aspect, or the second implementation manner of the first aspect, or the third implementation manner of the first aspect, or the fourth implementation manner of the first aspect, in a sixth implementation manner of the first aspect of the embodiments of the present disclosure, the mobile terminal is provided with a setting option, configured for the user to select whether to shoot one photo or continually shoot a preset quantity of photos when the control module turns on the camera for photo shooting.

With reference to the first aspect of the embodiments of the present disclosure, or the first implementation manner of the first aspect, or the second implementation manner of the first aspect, or the third implementation manner of the first aspect, or the fourth implementation manner of the first aspect, in a seventh implementation manner of the first aspect of the embodiments of the present disclosure, the mobile terminal is provided with a setting option, configured for the user to set automatic video shooting duration since the control module turns on the camera for video shooting.

With reference to the first aspect of the embodiments of the present disclosure, or the first implementation manner of the first aspect, or the second implementation manner of the first aspect, or the third implementation manner of the first aspect, or the fourth implementation manner of the first aspect, in an eighth implementation manner of the first aspect of the embodiments of the present disclosure, the mobile terminal is further provided with a viewfinder.

A second aspect of the embodiments of the present disclosure provides a method for starting shooting on a mobile terminal, including when the mobile terminal is in standby mode with a lock screen activated, performing detection with respect to a button on a housing of the mobile terminal, and when it is detected that a pressing operation of a user on the button meets a first preset condition, turning on a camera for shooting.

With reference to the second aspect of the embodiments of the present disclosure, in a first implementation manner of the second aspect of the embodiments of the present disclosure, the method further includes when it is detected that duration that the user continually presses the button reaches preset duration or when it is detected that preset duration that the user continually presses the button reaches a preset quantity of times, determining that the pressing operation of the user on the button meets the first preset condition.

With reference to the second aspect of the embodiments of the present disclosure, or the first implementation manner of the second aspect, in a second implementation manner of the second aspect of the embodiments of the present disclosure, the turning on a camera for shooting specifically includes turning on the camera to get ready for shooting, and after the camera is turned on to get ready, when it is detected that the pressing operation of the user on the button meets a second preset condition, controlling the camera to perform shooting, or when it is detected that the pressing operation of the user on the button does not meet a second preset condition, turning off the camera.

With reference to the second aspect of the embodiments of the present disclosure, or the first implementation manner of the second aspect, in a third implementation manner of the second aspect of the embodiments of the present disclosure, the turning on a camera for shooting specifically includes controlling the camera to turn on and perform shooting.

With reference to the second aspect of the embodiments of the present disclosure, or the first implementation manner of the second aspect, in a fourth implementation manner of the second aspect of the embodiments of the present disclosure, the method further includes after the mobile terminal is unlocked, when the pressing operation of the user on the button meets a third preset condition, controlling the mobile terminal to implement a default function corresponding to the button.

With reference to the second aspect of the embodiments of the present disclosure, or the first implementation manner of the second aspect, in a fifth implementation manner of the second aspect of the embodiments of the present disclosure, the button includes a first button and a second button, and when it is detected that a pressing operation of the user on the first button meets the first preset condition, the camera is turned on for video shooting, or when it is detected that a pressing operation of the user on the second button meets the first preset condition, the camera is turned on for photo shooting.

In the embodiments of the present disclosure, when a mobile terminal is in standby mode with a lock screen activated, a camera is turned on for shooting when a detection module detects that a pressing operation of a user on a button meets a first preset condition. As can be seen from the foregoing technical solutions, the embodiments of the present disclosure have the advantage of improving the photo shooting experience of such that a user can capture a wonderful view quickly.

DESCRIPTION OF EMBODIMENTS

Embodiments of the present disclosure provide a mobile terminal and a method for starting shooting on a mobile terminal, so that a user of a mobile terminal can capture a view quickly, therefore, photo shooting experience of the user is improved.

To make persons skilled in the art understand the technical solutions in the present disclosure better, the following clearly and completely describes the technical solutions in the embodiments of the present disclosure with reference to the accompanying drawings in the embodiments of the present disclosure. The described embodiments are merely some rather than all of the embodiments of the present disclosure. All other embodiments obtained by persons of ordinary skill in the art based on the embodiments of the present disclosure without creative efforts shall fall within the protection scope of the present disclosure.

Figure 1:
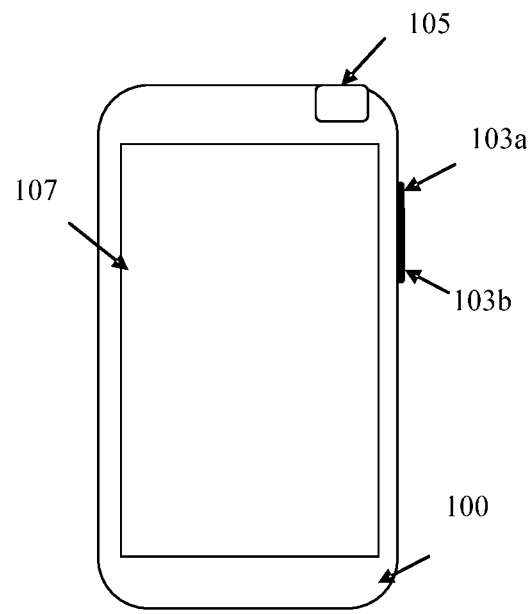
FIG. 1 and FIG. 2 are schematic diagrams of an embodiment of a mobile terminal in embodiments of the present disclosure.
Figure 2:
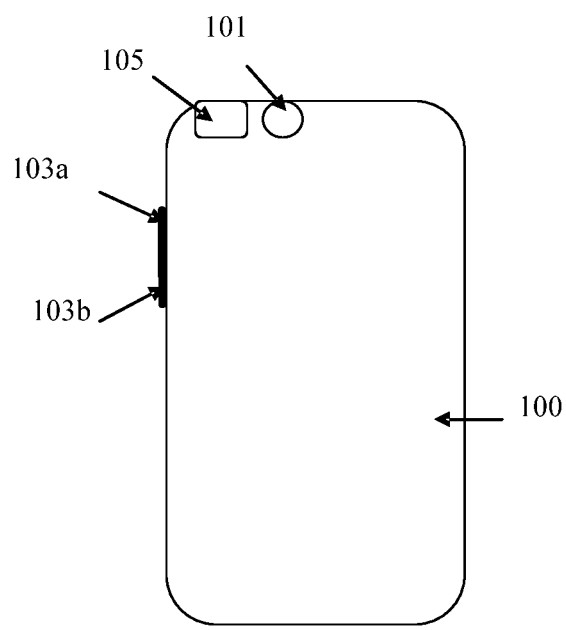

Referring to FIG. 1 and FIG. 2, an embodiment of a mobile terminal in the embodiments of the present disclosure includes a camera 101, a control module, and a button disposed on a housing of a mobile terminal 100, wherein the mobile terminal 100 may be a mobile phone, a tablet computer, or another mobile terminal provided with a camera, and the control module may be a processor. Certainly, the foregoing description is only exemplary and does not impose any limitation.

The control module is configured to perform detection with respect to the button when the mobile terminal 100 is in standby mode with a lock screen activated, and turn on the camera 101 for shooting when detecting that a pressing operation of a user on the button meets a first preset condition.

The button may be a physical button on the housing of the mobile terminal 100 or a virtual button. When the pressing operation on the button meets the first preset condition, the control module turns on the camera 101 for a photo shooting operation or a video shooting operation.

In this embodiment, when a mobile terminal is in standby mode with a lock screen activated, a camera, such as the camera 101, is turned on for shooting when a detection module detects that a pressing operation of a user on a button meets a first preset condition, so that a user of the mobile terminal can capture a wonderful view quickly, without the need to perform the multiple steps mentioned in the background to turn on a camera for shooting, therefore, photo shooting experience of the user is improved.

In this embodiment, the control module may be specifically configured to when detecting that a duration that the user continually presses the button reaches a preset duration or when detecting that the preset duration that the user continually presses the button reaches a preset quantity of times, determine that the pressing operation of the user on the button meets the first preset condition. For example, when detecting that the user holds down the button for 1.5 seconds, or when detecting that the user continually presses the button two times and holds down the button for one second or 1.5 seconds each, the control module determines that the pressing operation of the user on the button meets the first preset condition. Certainly, the foregoing button pressing time and quantity of times of continual button pressing are only exemplary and do not impose any limitation.

For some mobile terminals, a relatively long time is required to turn on a camera. To realize quick capture, the mobile terminal in this embodiment may be further set in a manner that, when detecting that the pressing operation of the user on the button meets the first preset condition, the control module is specifically configured to first turn on the camera to get ready for a shooting operation. The control module is further configured to, after the camera is turned on to get ready and when detecting that the pressing operation of the user on the button meets a second preset condition, control the camera to perform a shooting operation. When the control module detects that the pressing operation of the user on the button does not meet the second preset condition, turn off the camera.

For example, when detecting that the duration that the user continually presses the button reaches one second, the control module turns on the camera to get ready for shooting. The camera does not perform a shooting operation until it is detected that the duration that the user continually presses the button reaches 1.5 seconds or that the button is pressed again for one second immediately after the button has been pressed for one second. After the camera is turned on to get ready, if the control module detects that the duration that the user continually presses the button is shorter than 1.5 seconds, or that the button is not pressed again for one second immediately after the button has been pressed for one second, the camera is turned off. Certainly, the foregoing descriptions about the first preset condition and the second preset condition are only exemplary and do not impose any limitation.

For some mobile terminals, such as the mobile terminal 100, a relatively short time is required to turn on a camera. Then, the mobile terminal may be set in a manner that, when detecting that the pressing operation of the user on the button meets the first preset condition, the control module is specifically configured to control the camera to turn on and perform a shooting operation.

In this embodiment, after the mobile terminal is unlocked, when the pressing operation of the user on the button meets a third preset condition, the control module may be further configured to control the mobile terminal to implement a default function corresponding to the button. For example, the button is a volume up button disposed on the housing of the mobile terminal. When the mobile terminal is in standby mode with a lock screen activated, the camera can be turned on when duration that the volume up button is continually pressed reaches two seconds, after the mobile terminal is unlocked, each time the volume up button is pressed, a preset volume value of a sound played by the mobile terminal can be increased. In this way, it is unnecessary to provide an additional button on a surface of the housing of the mobile terminal, and an existing button on the surface of the housing of the mobile terminal is utilized to turn on the camera quickly, requiring no additional physical costs.

Preferably, the button described in this embodiment includes a first button 103a and a second button 103b. When detecting that a pressing operation of the user on the first button 103a meets the first preset condition, the control module turns on the camera 101 for a video shooting operation, and when detecting that a pressing operation of the user on the second button 103b meets the first preset condition, the control module turns on the camera 101 for a photo shooting operation. For example, the first button 103a is a volume up button, and the second button 103b is a volume down button. After a video shooting operation starts to be performed, the control module may be further configured to turn off the camera when detecting that the second button 103b is pressed again by the user.

Certainly, in actual application, the button may also include only one button. Correspondingly, the mobile terminal may be set in a manner that, the control module controls, when detecting that the pressing operation of the user on the button meets the first preset condition, the camera to turn on and perform a photo shooting operation, and controls, when detecting that the pressing operation of the user on the button meets a fourth preset condition, the camera to turn on and perform a video shooting operation. Alternatively, the mobile terminal may be set in a manner that, the control module turns, when detecting that the pressing operation of the user on the button meets the first preset condition, on the camera to get ready for a photo shooting operation, and controls, when the second preset condition is met, the camera to perform a photo shooting operation, or turns off the camera if the second preset condition is not met, and the control module turns, when detecting that the pressing operation of the user on the button meets a fourth preset condition, on the camera to get ready for a video shooting operation, and controls, when a fifth preset condition is met, the camera to perform a video shooting operation, or turns off the camera if the fifth preset condition is not met. Certainly, a sequence for the photo shooting operation and the video shooting operation in the foregoing example is changeable.

For example, when detecting that the duration that the user continually presses the button reaches 1 second but is shorter than 1.5 seconds, the control module controls the camera to turn on and perform a photo shooting operation, and when detecting that the duration that the user continually presses the button reaches 2 seconds, the control module controls the camera to turn on and perform a video shooting operation. Alternatively, the control module turns, when detecting that the duration that the user continuously presses the button reaches 0.5 second, on the camera to get ready for a photo shooting operation, controls, when detecting that the duration that the user continuously presses the button reaches 1 second but is shorter than 1.5 seconds, the camera to perform a photo shooting operation, and turns off the camera if detecting that the duration that the user continually presses the button reaches 0.5 second but does not reach 1 second. The control module turns, when detecting that the duration that the user continually presses the button reaches 2 seconds, on the camera to get ready for a video shooting operation, controls, when detecting that the duration that the user continually presses the button reaches 2.5 seconds, the camera to perform a video shooting operation, and turns off the camera if detecting that the duration that the user continually presses the button reaches 2 seconds but does not reach 2.5 seconds. In addition, after the camera starts to perform a video shooting operation, the control module may be further configured to turn off the camera when detecting that the button is pressed again by the user. Certainly, the foregoing description about each preset condition is only exemplary and does not impose any limitation.

In this embodiment, the mobile terminal may be further provided with a setting option, configured for the user to select whether to shoot one photo or continually shoot a preset quantity of photos when the control module turns on the camera 101 for photo shooting.

In this embodiment, the mobile terminal may be further provided with a setting option, configured for the user to set automatic video shooting duration after the control module turns on the camera 101 for video shooting, so that the camera 101 is automatically turned off after performing shooting for the preset duration since being turned on.

In this embodiment, the mobile terminal may be further provided with a setting option, configured for the user to set whether to enable a function of turning on the camera quickly upon button pressing when the mobile terminal is in standby mode with a lock screen activated.

In this embodiment, when the mobile terminal 100 is in standby mode with a lock screen activated, the control module is configured to turn on a display screen 107 of the mobile terminal 100 while turning on the camera 101, where the display screen is configured to display a view captured by the camera 101, allowing the user to control a view to be shot.

Alternatively, the control module may skip turning on the display screen of the mobile terminal 100, and instead, the mobile terminal 100 is provided with a viewfinder 105, so that the user uses the viewfinder 105 to capture a view to be shot. In this way, the mobile terminal may be further set in a manner that, after the camera is turned on and performs a shooting operation when the mobile terminal is in standby mode with a lock screen activated, the screen is lightened by pressing a power button of the mobile terminal, and a common shooting mode is entered using the display screen, so that the user can control shooting manually.

In this embodiment, when turning on the camera for a photo shooting operation or to start performing a video shooting operation, the control module may be further configured to control the mobile terminal to make a sound or vibrate to alert the user.

Figure 3:
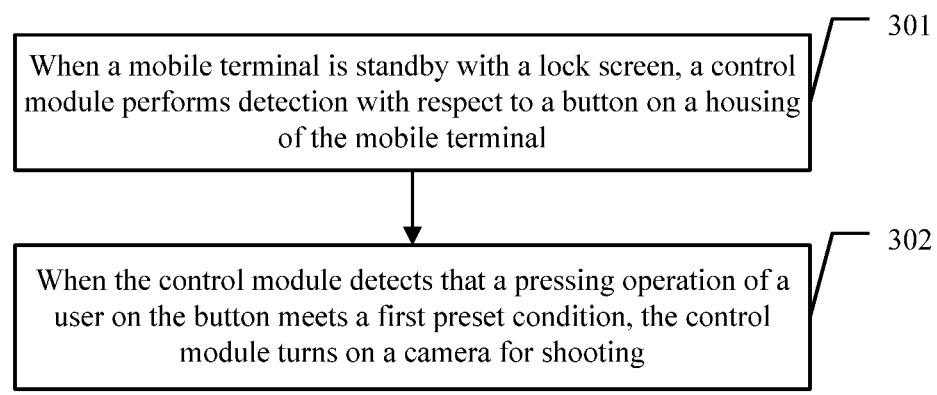
FIG. 3 is a schematic diagram of an embodiment of a method for starting shooting on a mobile terminal in the embodiments of the present disclosure.

The foregoing describes a mobile terminal in the embodiments of the present disclosure, and the following describes a method for starting shooting on a mobile terminal, such as the mobile terminal 100 of FIG. 1, in the embodiments of the present disclosure. Referring to FIG. 3, an embodiment of a method for starting shooting on the mobile terminal in the embodiments of the present disclosure includes:

301: When the mobile terminal is in standby mode with a lock screen activated, perform detection with respect to a button on a housing of the mobile terminal.

The mobile terminal may be a mobile phone, a tablet computer, or another mobile terminal provided with a camera, such as camera 101 of FIG. 1.

302: When it is detected that a pressing operation of a user on the button meets a first preset condition, turn on a camera for shooting.

The button may be a physical button on the housing of the mobile terminal or a virtual button. When the pressing operation on the button meets the first preset condition, the camera is turned on for a photo shooting operation or a video shooting operation.

In the embodiment of the present disclosure, when a mobile terminal is in standby mode with a lock screen activated, a camera is turned on for shooting when it is detected that a pressing operation of a user on a button meets a first preset condition, so that a user of a mobile terminal can capture a wonderful view quickly, therefore, photo shooting experience of the user is improved.

In this embodiment, the mobile terminal may be further provided with a setting option, configured for the user to select whether to shoot one photo or continually shoot a preset quantity of photos when the control module turns on the camera for photo shooting.

In this embodiment, the mobile terminal may be further provided with a setting option, configured for the user to set automatic video shooting duration after the camera is turned on for video shooting, so that the camera is automatically turned off after performing shooting for the preset duration since being turned on.

In this embodiment, the mobile terminal may be further provided with a setting option, configured for the user to set whether to enable a function of turning on the camera quickly upon button pressing when the mobile terminal is in standby mode with a lock screen activated.

In this embodiment, when the mobile terminal is in standby mode with a lock screen activated, a display screen of the mobile terminal may be turned on while the camera is turned on, so that the display screen is configured to display a view captured by the camera, allowing the user to control a view to be shot.

Alternatively, turning on the display screen of the mobile terminal may be skipped while the camera is turned on, and instead, the mobile terminal is provided with a viewfinder, so that the user uses the viewfinder to capture a view to be shot. In this way, the mobile terminal may be further set in a manner that, after the camera is turned on and performs a shooting operation when the mobile terminal is in standby mode with a lock screen activated, the screen is lightened by pressing a power button of the mobile terminal, and a common shooting mode is entered using the display screen, so that the user can control shooting manually.

In this embodiment, when the camera is turned on for a photo shooting operation or to start performing a video shooting operation, the mobile terminal may be further controlled to make a sound or vibrate to alert the user.

Figure 4:
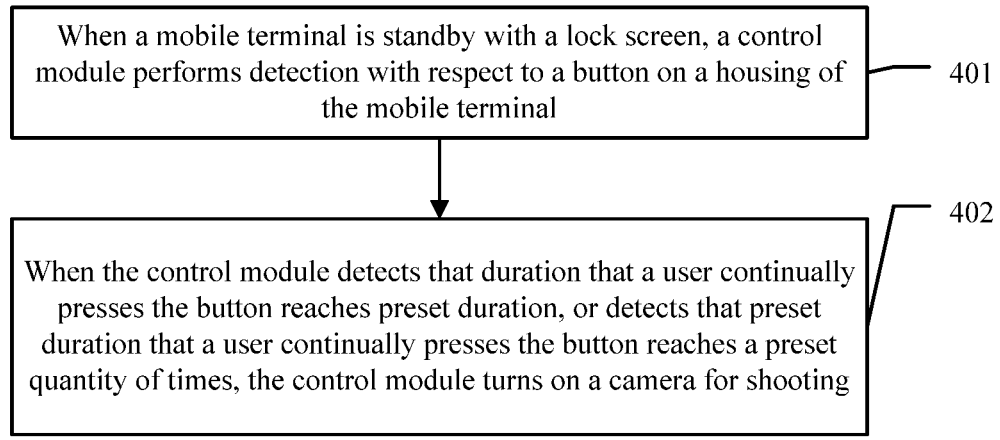
FIG. 4 is a schematic diagram of another embodiment of a method for starting shooting on a mobile terminal in the embodiments of the present disclosure.

Referring to FIG. 4, another embodiment of a method for starting shooting on a mobile terminal, such as the mobile terminal 100 of FIG. 1, in the embodiments of the present disclosure includes:

401: When the mobile terminal is in standby mode with a lock screen activated, perform detection with respect to a button on a housing of the mobile terminal.

402: When it is detected that duration that a user continually presses the button reaches preset duration or when it is detected that preset duration that a user continually presses the button reaches a preset quantity of times, turn on a camera, such as the camera 100 of FIG. 1, for shooting.

For example, when it is detected that the user holds down the button for 1.5 seconds, or when it is detected that the user presses the button for two times continually and each time holds down the button for one second or 1.5 seconds, the camera is turned on for shooting. Certainly, the foregoing button pressing time and quantity of times of continual button pressing are only exemplary and do not impose any limitation.

Figure 5:
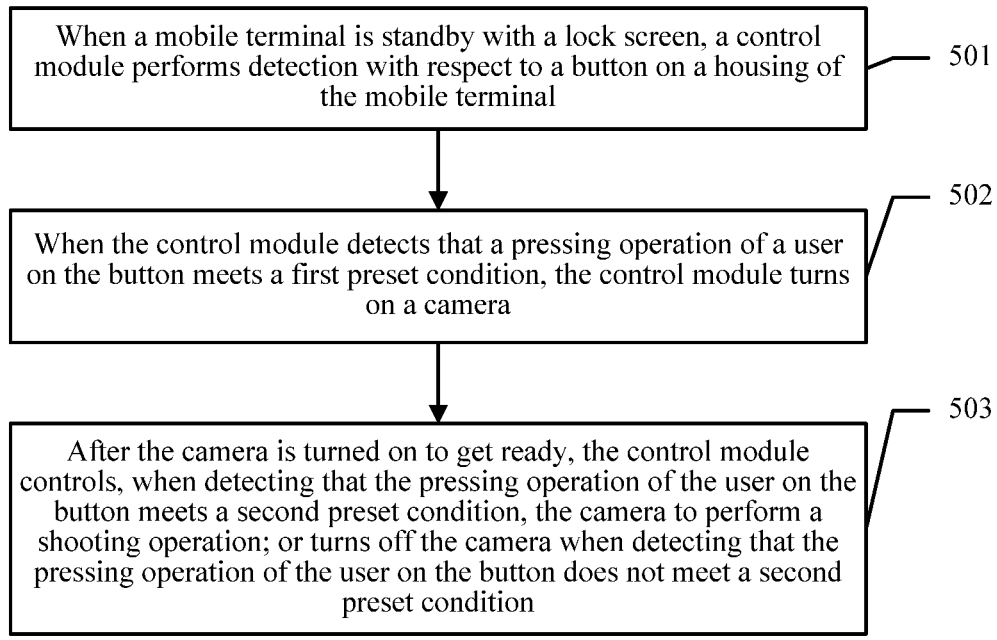
FIG. 5 is a schematic diagram of another embodiment of a method for starting shooting on a mobile terminal in the embodiments of the present disclosure.

Referring to FIG. 5, another embodiment of a method for starting shooting on a mobile terminal, such as the mobile terminal 100 in FIG. 1, in the embodiments of the present disclosure includes:

501: When the mobile terminal is in standby mode with a lock screen activated, perform detection with respect to a button on a housing of the mobile terminal.

502: When it is detected that a pressing operation of a user on the button meets a first preset condition, turn on a camera, such as the camera 101 of FIG. 1, to get ready for shooting.

503: After the camera is turned on to get ready, when it is detected that the pressing operation of the user on the button meets a second preset condition, control the camera to perform a shooting operation, or when it is detected that the pressing operation of the user on the button does not meet the second preset condition, turn off the camera.

For example, when it is detected that the duration that the user continually presses the button reaches one second, the camera is turned on to get ready for shooting, and when it is detected that the duration that the user continually presses the button reaches 1.5 seconds or the button is pressed again for one second immediately after the button has been pressed for one second, the camera is controlled to perform a shooting operation. After the camera is turned on to get ready, if it is detected that the duration that the user continually presses the button is shorter than 1.5 seconds, or the button is not pressed again for one second immediately after the button has been pressed for one second, the camera is turned off Certainly, the foregoing descriptions about the first preset condition and the second preset condition are only exemplary and do not impose any limitation.

In this embodiment, through phased operations, a camera that starts relatively slow can be turned on earlier to implement quick capture.

Certainly, for some mobile terminals, a relatively short time is required to turn on a camera. Then, the mobile terminal may be set in a manner that, when it is detected that the pressing operation of the user on the button meets the first preset condition, the camera is turned on and performs a shooting operation.

Figure 6:
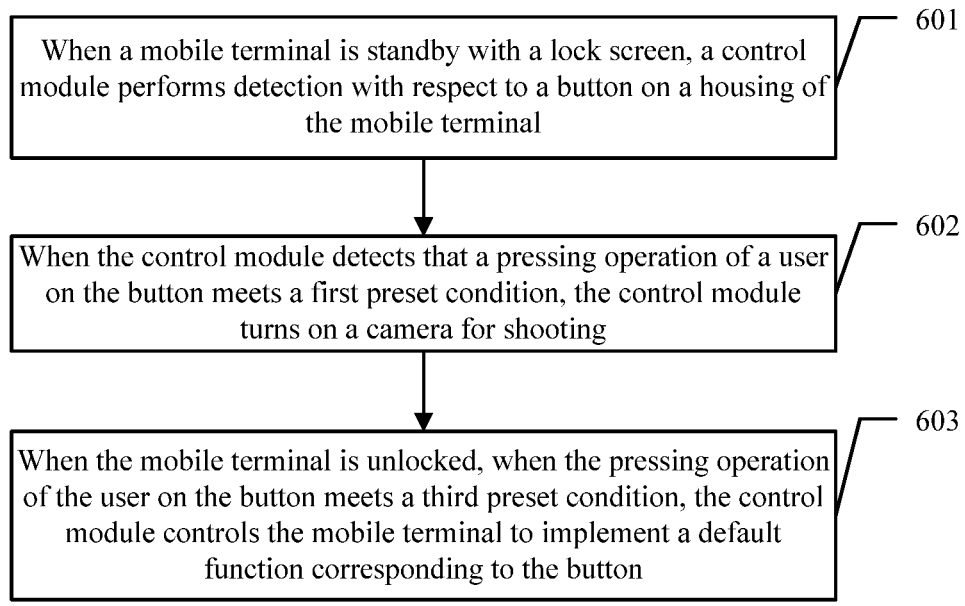
FIG. 6 is a schematic diagram of another embodiment of a method for starting shooting on a mobile terminal in the embodiments of the present disclosure.

Referring to FIG. 6, another embodiment of a method for starting shooting on a mobile terminal, such as the mobile terminal 100 of FIG. 1, in the embodiments of the present disclosure includes:

601: When the mobile terminal is in standby mode with a lock screen activated, perform detection with respect to a button on a housing of the mobile terminal.

602: When it is detected that a pressing operation of a user on the button meets a first preset condition, turn on a camera, such as the camera 101, of FIG. 1, for shooting.

603: When the mobile terminal is unlocked, when the pressing operation of the user on the button meets a third preset condition, control the mobile terminal to implement a default function corresponding to the button.

For example, the button is a power button. When the mobile terminal is in standby mode with a lock screen activated, when it is detected that duration that the power button is continually pressed by the user reaches one second, the camera is turned on for shooting, and when the mobile terminal is unlocked, when the duration that the power button is continually pressed by the user reaches two seconds, the mobile terminal is controlled to power off Certainly, the foregoing button selection and the first and third preset conditions are only exemplary and do not impose any limitation. It is worth noting that the first preset condition and the third preset condition may be same or may be different.

In this embodiment, it is unnecessary to provide an additional button on a surface of the housing of the mobile terminal, and an existing button on the surface of the housing of the mobile terminal is utilized to turn on the camera quickly, requiring no additional physical costs.

Figure 7:
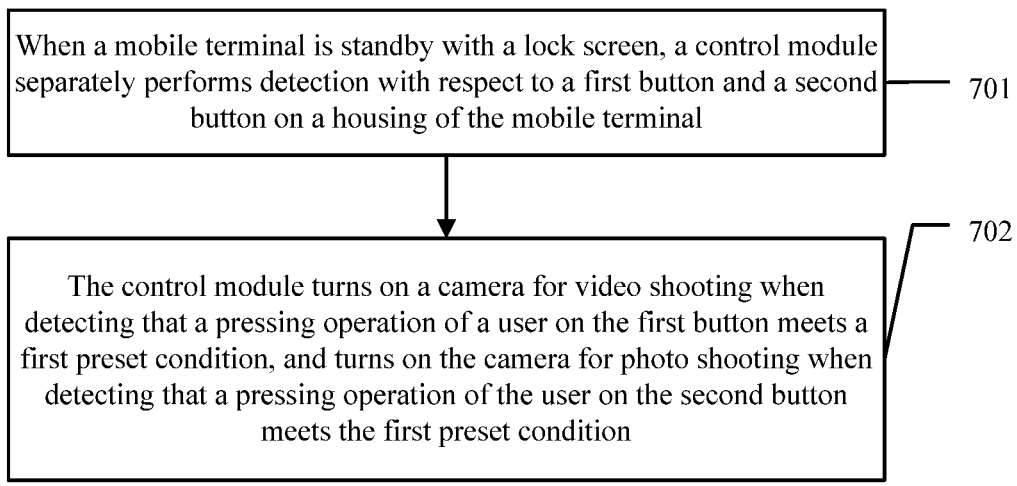
FIG. 7 is a schematic diagram of another embodiment of a method for starting shooting on a mobile terminal in the embodiments of the present disclosure.

Referring to FIG. 7, another embodiment of a method for starting shooting on a mobile terminal, such as the mobile terminal 100 of FIG. 1, in the embodiments of the present disclosure includes:

701: When the mobile terminal is in standby mode with a lock screen activated, separately perform detection with respect to a first button and a second button on a housing of the mobile terminal.

702: When it is detected that a pressing operation of a user on the first button meets a first preset condition, turn on a camera, such as the camera 101 of FIG. 1, for video shooting, and when it is detected that a pressing operation of the user on the second button meets the first preset condition, turn on the camera for photo shooting.

For example, the first button is a volume up button, and the second button is a volume down button. After a video shooting operation starts to be performed, the camera may be further turned off when it is detected that the second button is pressed again by the user.

In this embodiment, the two buttons are set to respectively corresponding to a photo shooting operation and a video shooting operation of the camera, so that the user can select a camera operation more conveniently for quick capture.

Certainly, in actual application, the button may also include only one button. Correspondingly, the mobile terminal may be set in a manner that, when it is detected that the pressing operation of the user on the button meets the first preset condition, the camera is turned on and performs a photo shooting operation, and when it is detected that the pressing operation of the user on the button meets a fourth preset condition, the camera is turned on and performs a video shooting operation. Alternatively, the mobile terminal may be set in a manner that, when it is detected that the pressing operation of the user on the button meets the first preset condition, the camera is turned on to get ready for a photo shooting operation, and when a second preset condition is met, the camera is controlled to perform a photo shooting operation, or the camera is turned off if the second preset condition is not met, and when it is detected that the pressing operation of the user on the button meets a fourth preset condition, the camera is turned on to get ready for a video shooting operation, and when a fifth preset condition is met, the camera is controlled to perform a video shooting operation, or the camera is turned off if the fifth preset condition is not met. Certainly, a sequence for the photo shooting operation and the video shooting operation described in the foregoing example is changeable.

For example, when it is detected that the duration that the user continually presses the button reaches 1 second but is shorter than 1.5 seconds, the camera is turned on and performs a photo shooting operation, and when it is detected that the duration that the user continually presses the button reaches 2 seconds, the camera is turned on and performs a video shooting operation. Alternatively, when it is detected that the duration that the user continually presses the button reaches 0.5 second, the camera is turned on to get ready for a photo shooting operation, when it is detected that the duration that the user continually presses the button reaches 1 second but is shorter than 1.5 seconds, the camera is controlled to perform a photo shooting operation, and if the it is detected that the duration that the user continually presses the button reaches 0.5 second but does not reach 1 second, the camera is turned off. When it is detected that the duration that the user continually presses the button reaches 2 seconds, the camera is turned on to get ready for a video shooting operation, when it is detected that the duration that the user continually presses the button reaches 2.5 seconds, the camera is controlled to perform a video shooting operation, and if the it is detected that the duration that the user continually presses the button reaches 2 seconds but does not reach 2.5 seconds, the camera is turned off. In addition, after the camera starts to perform a video shooting operation, the camera may be further turned off when it is detected that the button is pressed again by the user. Certainly, the foregoing description about each preset condition is only exemplary and does not impose any limitation.

For ease of understanding, the following uses an actual application scenario to describe the method for starting shooting on a mobile terminal in this embodiment.

On a housing of the mobile terminal, the mobile terminal is provided with two physical buttons including a volume up button and a volume down button, a camera, and a viewfinder. Using setting options in the mobile terminal, a user may, in advance, set that a function of turning on the camera quickly upon button pressing when the mobile terminal is in standby mode with a lock screen activated, set that three photos are continually shot when the camera is turned on for photo shooting, and set automatic video shooting duration after the camera is turned on for video shooting to twenty minutes.

When the mobile terminal is in standby mode with a lock screen activated, when it is detected that duration that the volume up button is continually pressed by the user reaches 1 second, the camera is turned on, and when it is detected that total duration that the volume up button is continually pressed by the user reaches 1.5 seconds, the camera is controlled to continually shoot three photos, and the mobile terminal is controlled to make a sound or vibrate to alert the user.

When it is detected that duration that the volume down button is continually pressed by the user reaches 1 second, the camera is turned on, when it is detected that total duration that the volume down button is continually pressed by the user reaches 1.5 seconds, the camera is controlled to start performing a video shooting operation, and the mobile terminal is controlled to make a sound or vibrate to alert the user, and the camera is automatically turned off after twenty minutes of video shooting. Within twenty minutes after the camera starts performing the video shooting operation, when it is detected that the user presses the volume down button again, the camera is turned off and the video shooting operation is ended.

In the foregoing camera shooting process, a view captured by the camera is a view seen by the user using the viewfinder of the mobile terminal.

After the mobile terminal is unlocked, each time when it is detected that the volume up button is pressed by the user, a preset volume value of a sound made by the mobile terminal is increased, and each time when it is detected that the volume down button is pressed by the user, the preset volume value of a sound made by the mobile terminal is decreased.

The foregoing embodiments are merely intended to describe the technical solutions of the present disclosure, but not to limit the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A mobile terminal, comprising:
a camera;
a display screen
a processor coupled to the camera and the display screen; and
a housing coupled to the camera and the display screen and comprising a button coupled to the processor,
wherein the processor is configured to:
perform detection with respect to the button when the mobile terminal is in a standby mode with a lock screen;
turn on the camera to get ready for shooting and turn on the display screen to display a view capture by the camera when detecting that a pressing operation of a user on the button meets a first preset condition;
control the camera to perform shooting after the camera is turned on to get ready and when detecting that the pressing operation of the user on the button meets a second preset condition; and
control the mobile terminal to implement a default function corresponding to the button after the mobile terminal is unlocked and when the pressing operation of the user on the button meets a third preset condition.

2. The mobile terminal according to claim 1, wherein the processor is further configured to determine that the pressing operation of the user on the button meets the first preset condition when detecting that a duration that the user continually presses the button reaches a preset duration.

3. The mobile terminal according to claim 1, wherein the housing further comprises a second button, and wherein the processor is further configured to:
turn on the camera for video shooting when detecting that the pressing operation of the user on the button meets the first preset condition; and
turn on the camera for photo shooting when detecting that the pressing operation of the user on the second button meets the first preset condition.

4. The mobile terminal according to claim 1, wherein the mobile terminal is provided with a setting option configured to receive a selection indication at least one of whether to shoot one photo and continually shoot a preset quantity of photos when the processor turns on the camera for photo shooting.

5. The mobile terminal according to claim 1, wherein the mobile terminal is provided with a setting option configured to receive an automatic video shooting duration since the processor turns on the camera for video shooting.

6. The mobile terminal according to claim 1, wherein the mobile terminal is further provided with a viewfinder.

7. A method for starting shooting on a mobile terminal, wherein the mobile terminal comprises a camera, a display screen, a processor coupled to the camera and the display screen, and a housing coupled to the camera and the display screen and comprising a button, the method comprising:
performing detection with respect to the button when the mobile terminal is in a standby mode with a lock screen;
turning on the camera for shooting when a pressing operation on the button meets a first preset condition;
turning on the display screen to display a view captured by the camera when the pressing operation on the button meets a first preset condition;

controlling the camera to perform shooting after the camera is turned on to get ready and when the pressing operation of the user on the button meets a second preset condition; and controlling the mobile terminal to implement a default function corresponding to the button after the mobile terminal is unlocked and when the pressing operation of the user on the button meets a third preset condition.

8. The method for starting shooting on the mobile terminal according to claim 7, wherein the method further comprises determining that the pressing operation of the user on the button meets the first preset condition when a duration that the user continually presses the button reaches a preset duration.

9. The method for starting shooting on the mobile terminal according to claim 7, wherein the method further comprises:

turning on the camera to get ready for shooting; and controlling the camera to perform shooting after the camera is turned on to get ready and when the pressing operation of the user on the button meets a second preset condition.

10. The mobile terminal according to claim 1, wherein the processor is further configured to determine that the pressing operation of the user on the button meets the first preset condition when detecting that a quantity of times that the user continually presses the button reaches a preset quantity of times.

11. The mobile terminal according to claim 1, wherein the processor is further configured to turn off the camera when detecting that the pressing operation of the user on the button does not meet the second preset condition.

12. The method for starting shooting on the mobile terminal according to claim 7, wherein the method further comprises determining that the pressing operation of the user on the button meets the first preset condition when a quantity of times that the user continually presses the button reaches a preset quantity of times.

13. The method for starting shooting on the mobile terminal according to claim 7, wherein the method further comprises turning off the camera when the pressing operation of the user on the button does not meet a second preset condition.

14. The method for starting shooting on the mobile terminal according to claim 10, wherein the housing further comprises a second button, and wherein the method further comprises:

turning on the camera for video shooting when detecting that the pressing operation of the user on the button meets the first preset condition; and turning on the camera for photo shooting when the pressing operation of the user on the second button meets the first preset condition.

15. The mobile terminal according to claim 1, wherein the default function corresponding to the button comprises adjusting a volume value of a sound made by the mobile terminal.

16. The mobile terminal according to claim 15, wherein adjusting the volume value comprises increasing the volume value of the sound made by the mobile terminal.

17. The method for starting shooting on the mobile terminal according to claim 7, wherein the default function corresponding to the button comprises adjusting a volume value of a sound made by the mobile terminal.

18. The method for starting shooting on the mobile terminal according to claim 17, wherein adjusting the volume value comprises increasing the volume value of the sound made by the mobile terminal.

* * * * *

UNITED STATES PATENT AND TRADEMARK OFFICE
CERTIFICATE OF CORRECTION

PATENT NO. : 9,787,814 B2
APPLICATION NO. : 15/034011
DATED : October 10, 2017
INVENTOR(S) : Ji Ding It is certified that error appears in the above-identified patent and that said Letters Patent is hereby corrected as shown below:

In the Claims

Column 14, Lines 9-19, Claim 14, should read:
14. The method for starting shooting on the mobile terminal according to claim 7, wherein the housing further comprises a second button, and wherein the method further comprises:
 turning on the camera for video shooting when detecting that the pressing operation of the user on the button meets the first preset condition; and
 turning on the camera for photo shooting when the pressing operation of the user on the second button meets the first preset condition.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*